United States Patent Office
3,038,896
Patented June 12, 1962

3,038,896
1-(DI-LOWER ALKYL AMINO LOWER ALKYL THIO LOWER ALKYL)-AZA-[2,3:5,6]-DIBENZO-CYCLOHEPTADIENE COMPOUNDS
Ernst Habicht and Hans Müller, Schaffhausen, Switzerland, assignors to Cilag-Chemie Aktiengesellschaft, a Swiss company
No Drawing. Filed May 25, 1959, Ser. No. 815,255
Claims priority, application Switzerland May 30, 1958
3 Claims. (Cl. 260—239)

The present invention relates to pharmaceutical compositions, and particularly to sulfur containing amines of the general formula

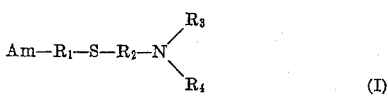

as active substances of the said pharmaceutical compositions.

In the above Formula I, $R_1$ and $R_2$ represent lower alkylene radicals, which shall contain a maximum of 3 carbon atoms each in straight chain, and Am represents a secondary or tertiary amino group, whereby $R_1$ and $R_2$ and the radicals in Am shall together contain not more than 14 carbon atoms. $R_3$ and $R_4$ shall form the following systems:

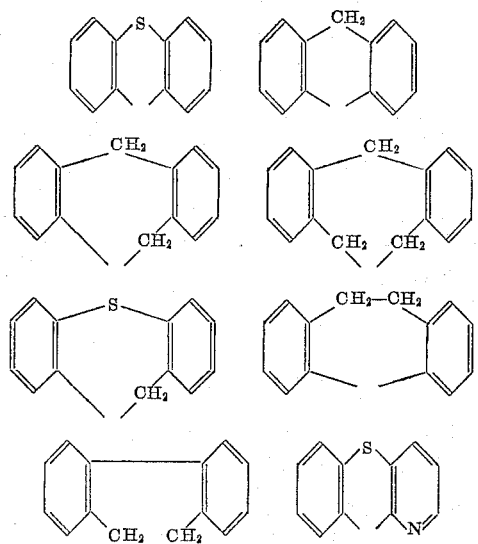

as well as

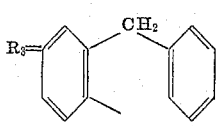

and $R_4$=H or lower alkyl (up to 4 carbon atoms).

The phenyl radicals forming these above systems can also contain substituents, such as halogeno atoms, particularly chlorine, alkyl, alkoxy or alkylmercapto groups as well as lower aliphatic acyl groups.

Am can have the following meanings: methylamino, dimethylamino, ethylamino, diethylamino, n-propylamino, di-n-propylamino, isopropylamino, di-isopropylamino, n-butylamino- di-n-butylamino, isobutylamino, di-isobutylamino, pyrrolidino, 2-methylpyrrolidino, 2,5-dimethylpyrrolidino, piperidino, 2-methylpiperidino, 2,6-dimethylpiperidino, morpholino, thiamorpholino, piperazino, N-methylpiperazino, N-ethylpiperazino, N-isopropylpiperazino.

Particularly the system

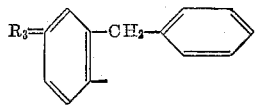

$R_4$=H or alkyl can show the following constitution:

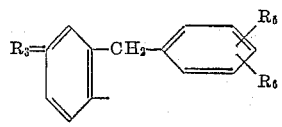

$R_5$ and $R_6$ representing hydrogen, alkyl, alkoxy or alkylmercapto with together not more than 4 carbon atoms, or representing chloro- or bromo- or hydroxy groups. These diphenylmethane derivatives are extremely strong antispasmodics with a very long lasting effect. Moreover, they have a sedative and histamine-antagonising effect.

The hitherto known antihistaminics and psychotropics showing a heterocyclic system as a rule of the following constitution:

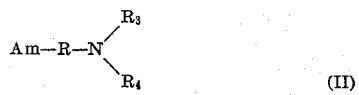

In this formula, Am, $R_3$ and $R_4$ have the same meaning as defined for Formula I, and R represents an alkylene radical.

As has now been found, interruption of the alkylene radical by a sulfur atom produces a detoxification of the molecule with conservation of the activity.

The sulfur containing amines obtainable in this manner show histamine antagonising properties, act as psychotropics, analgesics and sedatives, and in part have antiphlogistic properties. The diphenylmethane derivatives act, moreover, as spasmolytics.

The novel sulfur containing amines of the Formula I can be produced by reacting a compound of the formula

with the compound of the formula

and a compound of the formula

whereby in the above Formulae III, IV and V, A represents an easily splittable radical, D means the hydroxyl group esterified with a strong acid, and B and C are radicals capable of forming the sulfur bridge. According to this process, it is possible to proceed in such manner as to first react a compound of the Formula IV with a compound of the Formula V and to further react the resulting condensation product of the formula

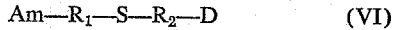

with a compound of the Formula III. It is for instance possible to react an aminoalkanethiol of the Formula IV or a salt of such an aminoalkanethiol (B=SH or SMe) with a reactive diester of an alkanethiol, such as for instance an alkane dihalogenide (Formula V: C or D respectively meaning a halogen atom), whereby the reaction can be directed in such manner that an aminoalkyl-thio-alkylhalogenide is formed (Formula VI: D=Hal), and to further react this latter compound with a compound of the Formula III or with a metal salt thereof (A=H or Me, respectively).

According to the process described hereinbefore, it is likewise possible to first react a compound of the Formula III with a compound of the Formula V, thereby obtaining an intermediate product of the formula

(VII)

and to allow a compound of the Formula IV to act on the Compound VII. It is for instance possible to react a mesoxy or a tosoxy alkyl halogenide of the Formula V (C=halogen;

$$D=CH_3-SO_2-O \text{ or } CH_3-C_6H_4-SO_2-O)$$

with a compound of the Formula III or with an alkali metal salt thereof (A=H or Me) and to further react the resulting halogenoalkyl compound of the Formula VII (C=halogen) with an aminoalkanethiol of the Formula IV (B=SH).

It is thus possible to obtain N-β-halogeno ethyl amines, N-β-halogeno propyl amines, or N-γ-halogeno propyl amines of the Formula VII (C=halogen) and to react these with the following aminoalkane thiols:

N-methylaminoethanethiol, N - ethylaminoethanethiol, N-butylaminoethanethiol, dimethylaminoethanethiol, diethylaminoethanethiol, dipropylaminoethanethiol, pyrrolidinoethanethiol, piperidinoethanethiol, morpholinoethanethiol, 2,5 - dimethyl-pyrrolidinoethanethiol, 2,6-dimethyl-piperidinoethanethiol, as well as with the respective β-aminopropanethiols and γ-aminopropanethiols, respectively.

The compounds mentioned in Formula I can likewise be obtained by reacting an amine of the Formula III (A=H) with an alkylenesulfide and by further reacting the resulting thiol-alkylamine of the Formula VII (C=SH) with an aminoalkylhalogenide.

A further possibility is to first acylate an amine of the Formula III with a carboxylic acid of the Formula V containing the radical C or with a reactive derivative of such an acid

and to then react the resulting intermediate product of the Formula VII with an aminoalkanethiol of the Formula IV if C means halogen, or with an aminoalkylhalogenide if C represents SH, and to reduce the resulting aminoalkyl thio acylamine in a manner known per se, for instance with the aid of LiAlH$_4$. The best method of this process consists in reacting an amine of the Formula III (A=H) with a halogenoparaffin-carboxylic acid halogenide, heating the resulting halogenoacylamine with an aminoalkanethiol in a lower aliphatic nitrile, such as for instance aceto nitrile, and reducing the aminoalkyl-mercaptoacylamine thus formed with the help of LiAlH$_4$. The introduction of the radical Am—R$_1$—S—R$_2$ in this manner is only successful if one of the radicals R$_3$ or R$_4$ in the amine II is of non-aromatic nature.

The new sulfur containing amines of the Formula I here above can be or are advantageously isolated in form of their salts with inorganic or organic non-toxic acids. The inorganic acids to be used for the salt formation are: sulfuric acid, hydrochloric acid, hydrobromic acid, phosphoric acid; the organic acids are: acetic acid, glycolic acid, citric acid, succinic acid, fumaric, maleinic acid, dioxymaleinic acid, methane-sulfonic acid, oxyethane-sulfonic acid, and others.

The definition non-toxic pharmaceutically acceptable acids includes not only such acids which are well compatible for the warmblooded animal, but generally such acids which in normal dosage produce no special pharmacological effects.

The resulting sulfur containing amines can likewise be converted into their quaternary salts, whereby two series of salts can be formed, i.e. the N-quaternary series and the N- and S-quaternary series. The nitrogen atom of the group Am is quaternised first, whereas an excess of quaternising agent serves to also quaternise (ternise) the sulfur atom. The quaternising agent can be chosen from the following compounds: alkyl- or aralkylhalogenides, alkyl- or aralkyl sulfates, alkanesulfonic acid alkyl esters, and others. The quaternisation is preferably performed in a solvent or diluent, as for instance in ethylacetate, ether, dioxane, etc. The pharmaceutical utilization of the quaternary salts requires that for their formation solely quaternising agents containing a pharmaceutically acceptable anion be used.

*Example 1*

139 g. of purified phenothiazine are added to 600 cc. of an ethereal solution of n-butyl lithium (containing 0.7 mols of BuLi). A solution of 155 g. of p-toluene-sulfonic acid-β-chloroethylester in 100 cc. of absolute ether is added dropwise while stirring and cooling to the phenothiazine lithium solution. After 2 hours, the solution is treated with water, the ether layer separated, and the ether dried and evaporated. The residue, consisting of 10-β-chloroethyl phenothiazine, is recrystallised from ethanol. A yield of 90–100 g. of the product melting at 97° C. is obtained.

4 g. of sodium are dissolved in 100 cc. of hot ethanol under nitrogen atmosphere and a solution of 20 g. of dimethylaminoethanethiol in 250 cc. of ethanol added thereto. Subsequently, 40 g. of 10-β-chloroethyl phenothiazine are added while stirring. The whole is heated to boiling during 11 hours while stirring and under nitrogen pressure. After cooling, the solution is distilled in vacuo and the residue is shaken well with ether and 2 N-acetic acid. The layers are separated, whereby the ether solution is extracted twice with 2 N-acetic acid. The combined acid aqueous extracts are rendered alkaline and the precipitating oil is taken up in ether. Drying of the ethereal solution is followed by evaporation. The residue is distilled under high vacuum. There are obtained 41 g. of 10-(β-dimethylaminoethyl thio ethyl)-phenothiazine, which boils under 0.08 mm. at 200–205° C. The novel phenothiazine is readily soluble in dilute acids. By reacting with methylbromide in ethylacetate, the methobromide of the tertiary base is obtained.

When reacting instead of dimethylaminoethanethiol, pyrrolidinoethanethiol with 10-β-chloroethyl phenothiazine, the 10-(β-pyrrolidinoethyl thio ethyl)-amino phenothiazine boiling under 0.05 mm. at 215° C. is obtained. This compound can be converted into the quaternary salt by allowing it to stand with methane-sulfonic acid methyl ester in dioxane. By recrystallising it from ethanol/ether, it is obtained in fine white form.

*Example 2*

In a manner analogous to that described in Example 1, there are obtained from 40 g. of 10-β-chloroethyl phenothiazine, 25 g. of diethylaminoethanethiol and 4 g. of sodium in a total of 300 cc. of ethanol, 45 g. of 10-(β-diethylaminoethyl thio ethyl)-phenothiazine, which boils under 0.07 mm. at 198–203° C.

There is likewise obtained from 10-β-chloroethyl phenothiazine and piperidinoethanethiol the 10-(β-piperidinoethyl thio ethyl)-phenothiazine boiling under 0.05 mm. at 205–207° C.

*Example 3*

40 g. of 10-β-chloroethylphenothiazine are heated in the usual manner to boiling for 12 hours while stirring with 30 g. of di-isopropylaminoethanethiol in the presence of 4 g. of sodium in totally 350 cc. of ethanol. After working up in the manner described in Example 1, 35 g. of 10-(β-di-isopropylaminoethyl thio ethyl)-phenothiazine boiling at 208–212° C. under 0.04 mm. pressure are obtained. The new phenothiazine forms at first a slightly yellow coloured oil, which after some time solidifies to crystals. The salts with hydrochloric acid, acetic acid and methane-sulfonic acid are not soluble more than approximately 2–4% in water.

When reacting 10-β-chloroethyl phenothiazine with β-(2,6-dimethyl piperidyl)-ethanethiol, the 10-[β-(2′,6′- dimethyl piperidyl)-ethyl thio ethyl]-phenothiazine which boils under 0.03 mm. at 214–216° C. is obtained.

It is possible to react with equal success instead of 10-β-chloroethyl phenothiazine, 10-γ-chloropropyl phenothiazine with tertiary aminoalkanethiols.

By reacting instead of chloroethyl- and chloropropyl phenothiazines, 10-chloroaklyl-3-chloro- and -3-methylmercapto phenothiazines with tertiary aminoalkanethiols, the respective 10-tert. aminoalkyl thio alkyl-3-chloro- and -3-methylcercapto phenothiazines are obtained.

*Example 4*

To a solution of 36.2 g. of o, o'-bis-bromomethyl diphenyl in 250 cc. of absolute benzene is added dropwise while stirring a solution of 20.6 g. of dimethylaminoethyl mercaptoethylamine in 250 cc. of absolute benzene. After leaving it standing for 70 hours at room temperature, water and dilute hydrochloric acid are added to the reaction solution and the organic layer is separated off after a good stirring. The aqueous acid layer is rendered alkaline and extracted with chloroform. The chloroform solution is extracted with 2 N-acetic acid and the combined aqueous acid layers are made alkaline. The precipitating oil is taken up in ether and the ether dried and evaporated. The residue, after having been subjected to high vacuum distillation, yields 25 g. of 6-(β-dimethylaminoethyl thio ethyl)-6,7-dihydro-5H-dibenz[c,e]-azepine, which boils at 190–195° C. under 0.01 mm. pressure. The hydrochloride of the azepine can be produced in ether with the aid of ethereal hydrochloric acid.

*Example 5*

A solution of 10 g. of dimethylaminoethanethiol in 50 cc. of acetonitrile is added to a solution of 24.3 g. of 1-chloroacetyl aza-[2,3:5,6]-dibenzocycloheptadiene (produced from the base and chloroacetylchloride in usual manner; M.P. 137–138° C.). The whole is stirred vigorously, whereby the temperature rises automatically to 32° C. After 10 minutes, the hydrochloride of the final product begins to crystallize. Treatment with water and 2 N-acetic acid is followed by separation of the aqueous solution, which latter is rendered alkaline with potassium carbonate and extracted with ether. After drying, the ethereal solution is evaporated and the residue distilled under fine vacuum. 20 g. of 1-(β-dimethylaminoethyl thio acetyl)-aza-[2,3:5,6]-dibenzocycloheptadiene boiling under 0.1 mm. at 200–205° C. are obtained.

10.5 g. of the resulting acetyl derivative in 40 cc. of tetrahydrofuran are reduced in the usual manner with 3 g. of LiAlH$_4$ in 100 cc. of tetrahydrofuran. At the end of the reduction the mass is rendered alkaline, the precipitating oil is taken up in ether, the ethereal solution extracted with 2 N-acetic acid and the acid solution again made alkaline. The basic compound is taken up in ether, the ethereal solution evaporated after drying and the residue distilled under fine vacuum. This yields 5 g. of the 1-(β-dimethylaminoethyl thio ethyl)-aza-[2,3:5,6]-dibenzocycloheptadiene, which boils at 190–193° C. under 0.01 mm. pressure. The new aza-dibenzocycloheptadiene derivative forms with hydrochloric acid, sulfuric acid, phosphoric acid, methanesulfonic acid and citric acid, in water readily soluble salts.

By reacting the chloroacetyl derivative with pyrrolidinoethanethiol and reducing the resulting pyrrolidinoethyl thio acetyl derivative, the 1-(β-pyrrolidinoethyl thio ethyl-aza-[2,3:5,6]-dibenzocycloheptadiene boiling under 0.01 mm. at 195–197° C. is obtained.

*Example 6*

40.5 g. of 1-(α-bromopropionyl)-aza-[2,3:5,6]-dibenzocycloheptadiene (produced in the usual manner from the base and α-bromopropionylbromide) are heated to boiling for 1–1½ hours with 16.8 g. of dimethylaminoethanethiol in 170 cc. of acetonitrile. This is followed by evaporation in vacuo to dryness. The residue is shaken for a time with carbon and the acid solution rendered alkaline with the aid of potassium carbonate. There follows extraction with ether, and the ethereal solution is then extracted with aqueous 2 N-glycolic acid. Extraction with ether is repeated after alkalization of the aqueous acid layer. The ethereal solution is subsequently dried and evaporated. The residue, after having been subjected to vacuum distillation, yields 22 g. of 1-(β-dimethylaminoethyl thio-α'-propionyl)-aza-[2,3:5,6]-dibenzocycloheptadiene. The new derivative boils under 0.09 mm. at 210° C. It forms a slightly yellow coloured, viscous oil, which is readily soluble in dilute acids.

19 g. of the resulting propionyl compound are reduced in the usual manner with the aid of 2.9 g. of LiAlH$_4$ in 100 cc. of tetrahydrofuran. The working up is performed as indicated in Example 5. 6 g. of 1-(β-dimethylaminoethyl thio isopropyl)-aza-[2,3:5,6]-dibenzocycloheptadiene of the formula

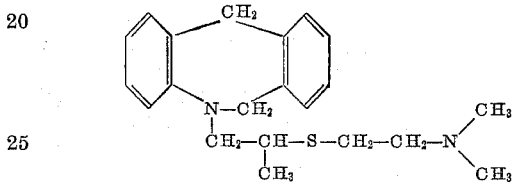

are thereby obtained. The new basic derivative boils at 192–195° C. under 0.1 mm. pressure. It forms a light, viscous oil. The dihydrochloride of the base can be produced in ether with the aids of ethereal hydrochloric acid. The oxalate of the base can be precipitated from acetone solution.

*Example 7*

By reacting molar quantities of chloroethylthiophenyl pyridylamine and dimethylaminoethanethiol in the manner indicated in Example 1, the β-dimethylaminoethyl thio ethyl thiophenyl pyridylamine of the formula

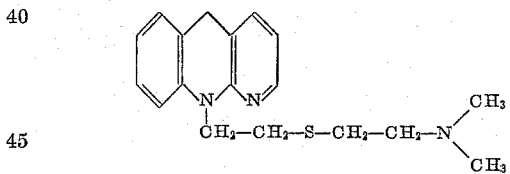

is obtained, which boils under 0.01 mm. at 190–192° C.

It is likewise possible to react instead of dimethylaminoethanethiol pyrrolidinoethanethiol or piperidinoethanethiol with the chloroethyl thiophenyl pyridylamine in order to obtain the respective pyrrolidinoethyl- and piperidinoethyl thio ethyl thiophenyl pyridylamines.

*Example 8*

The reaction of equimolecular quantities of 1-thia-4-aza-[b,f]-dibenzocycloheptadiene-[2,6] with ethylmagnesiumbromide and further reaction of the resulting N-magnesylbromide compound with p-toluene-sulfonic acid-β-chloroethylester leads to the 4-β-chloroethyl-1-thia-4-aza-dibenzocycloheptadiene. By reacting this latter with dimethylaminoethanethiol, there is obtained the derivative of the formula

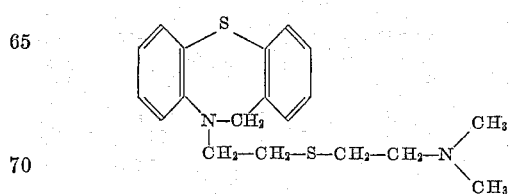

*Example 9*

The reaction of β,β-dichloro diethylsulfide with dimethylaminomagnesylbromide in ether leads to the β- dimethylaminoethyl thio ethyl chloride. This again can be reacted with iminodibenzyl, whereby the substance of the formula

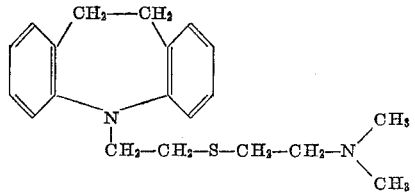

is obtained. The new iminodibenzyl derivative forms a light oil, which is soluble in benzene, ethylacetate and dilute acids.

Example 10 o-Methylamino diphenylmethane is converted in the usual manner with chloroacetylchloride into the chloroacetyl compound (M.P. 53–54° C., from ether/petroleum ether).

12 g. of the resulting chloroacetyl compound are stirred vigorously with 4.7 g. of dimethylaminoethanethiol in 50 cc. of acetonitrile. The temperature rises automatically to 32° C. The reaction is then brought to an end by short boiling. There follows treatment with water and dilute hydrochloric acid and shaking with ether. The aqueous acid layer is rendered alkaline and extracted with ether. Drying of the ethereal solution is followed by evaporation, and the residue distilled under high vacuum. 9 g. of the o-(N-methyl-N-β-dimethylaminoethyl thio acetyl)-amino diphenylmethane boiling at 195–198° C. under 0.01 mm. pressure are obtained.

Reduction in the usual manner of 6 g. of the resulting acetyl derivative with 1.9 g. of LiAlH$_4$ in 100 cc. of tetrahydrofuran and subsequent working up yield 3 g. of o-(N-methyl-N-β-dimethylaminoethyl thio ethyl)-amino diphenylmethane. The new compound forms a light yellow oil, which boils under 0.1 mm. at 178–179° C. Crystalline salts are obtained with hydrochloric acid or hydrobromic acid in an ethereal solution. The base forms crystalline salts also with citric acid, oxalic acid, fumaric acid and methylene-bis-salicylic acid.

Example 11

5.8 g. of o-(N-ethyl-N-chloroacetyl)-amino diphenylmethane (produced in known manner from the base and chloroacetylchloride) in 50 cc. of acetonitrile are heated to boiling for 1 hour with 3.2 g. of dimethylaminoethanethiol. Subsequently to cooling, the reaction mass is shaken with dilute hydrochloric acid and ether, and the acid solution separated off and rendered alkaline with potassium carbonate. The precipitating oil is taken up in ether, and the ether dried and then evaporated. The residue, after having been distilled under fine vacuum, yields 4 g. of o-(N-ethyl-N-β-dimethylaminoethyl thio acetyl)-amino diphenylmethane. The new acetyl derivative boils at 190–192° C. under 0.01 mm. pressure.

By reducing the resulting acetyl derivative with LiAlH$_4$, the o-(N-ethyl-N-β-dimethylaminoethyl thio ethyl)-amino diphenylmethane boiling under 0.02 mm. at 168° C. is obtained.

Example 12

The reaction of 12.7 g. of o-(N-methyl-N-chloroacetyl)-amino diphenylmethane with 6.4 g. of diethylaminoethanethiol in 50 cc. of acetonitrile leads to the o-(N-methyl-N-β-diethylaminoethyl thio acetyl)-amino diphenylmethane, which boils under 0.015 mm. at 210–212° C.

This acetyl product can be reduced in the usual manner, whereby the o-(N-methyl-N-β-diethylaminoethyl thio ethyl)-amino diphenylmethane boiling under 0.05 mm. at 170–173° C. is obtained. The base forms a light yellow, viscous oil, which has a good solubility in dilute acids.

Example 13

22.1 g. of o-(N-methyl-N-α-bromopropionyl)-amino diphenylmethane and 7.9 g. of dimethylaminoethanethiol in 80 cc. of acetonitrile yield 14 g. of o-(N-methyl-N-β-dimethylaminoethyl thio-α-propionyl)-amino diphenylmethane, which boils under 0.05 mm. at 192° C.

The reduction with LiAlH$_4$ leads to the o-(N-methyl-N-β-dimethylaminoethyl thio isopropyl)-amino diphenylmethane boiling at 180° C. under 0.04 mm. pressure.

Example 14

19.7 g. of o-amino-p'-methyl diphenylmethane and 12.9 g. of ethyl diisopropylamine are dissolved in 100 cc. of absolute ether. This solution is added dropwise to a solution of 11.3 g. of chloroacetylchloride in 100 cc. of absolute ether. The reaction solution is stirred for some hours at 20° C. and then treated with 200 cc. of 2 N-HCl. The crystals are filtered off with suction and then recrystallised from ethanol/water, whereby 28 g. of the o-chloroacetylamino-p'-methyl diphenylmethane melting at 122–125° C. are obtained.

28 g. of the resulting compound are heated to boiling for 1 hour with 12.6 g. of dimethylaminoethanethiol in 200 cc. of acetonitrile. Subsequently, the solvent is distilled in vacuo and the residue dissolved in 300 cc. of 1 N-acetic acid. The solution is filtered and the filtrate made alkaline with saturated aqueous potassium carbonate solution. The precipitating oil is taken up in ether and the ether evaporated after drying. The residue, after having been distilled under fine vacuum, yields 18.5 g. of o-(β-dimethylaminoethyl thio acetyl)-amino-p'-methyl diphenylmethane. The new acetyl derivative forms a slightly yellow coloured, viscous oil, which distills at 199° C. under 0.01 mm. pressure. It solidifies after a time to pale-yellow crystals which are readily soluble in dilute acids, in ether and in benzene.

By reducing 12 g. of the resulting acetyl compound in the usual manner with 2 g. of LiAlH$_4$ in totally 80 cc. of tetrahydrofuran, 6 g. of o-(β-dimethylaminoethyl thio ethyl)-amino-p'-methyl diphenylmethane are obtained in form of a nearly colourless oil boiling under 0.02 mm. at 180–185° C.

Example 15

19.7 g. of o-N-methyl-N-chloroacetylamino-p'-methyl diphenylmethane are reacted in the usual manner with 8.4 g. of dimethylaminoethanethiol in 150 cc. of acetonitrile. The working up, which is performed in known manner, leads to 12 g. of o-(N-methyl-N-β-dimethylaminoethyl thio acetyl)-amino-p'-methyl diphenylmethane, which boils under 0.01 mm. at 210° C.

By reducing 5 g. of the above acetyl compound with 1 g. of LiAlH$_4$, 3 g. of o-(N-methyl-N-β-dimethylaminoethyl thio ethyl)-amino-p'-methyl diphenylmethane boiling under 0.04 mm. at 180° C. are obtained. The new diphenylmethane derivative forms a colourless oil which is readily soluble in dilute acids.

Example 16

By reacting o-amino-p'-methoxy diphenylmethane with chloroacetylchloride in the presence of ethyl diisopropylamine in ether, the chloroacetyl compound is obtained. 28 g. of this chloracetyl derivative are reacted in the usual manner with 11.6 g. of dimethylaminoethanethiol. The working up yields 20 g. of o-(β-dimethylaminoethyl thio acetyl)-amino-p'-methoxy diphenylmethane, which boils under 0.008 mm. at 210° C.

The reduction of 9 g. of the resulting acetyl compound with 2 g. of LiAlH$_4$ in a mixture of tetrahydrofuran and benzene yields 4 g. of a nearly colourless oil which boils at 186° C. under 0.006 mm. pressure. This oil represents the o-(β-dimethylaminoethyl thio ethyl)-amino-p'-methoxy diphenylmethane. It is readily soluble in ether, benzene and chloroform, as well as in dilute inorganic and organic acids.

What we claim is:
1. A compound of the formula
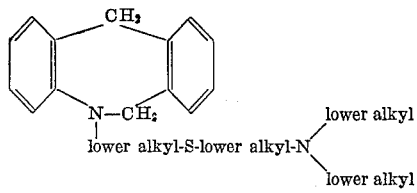
2. The compound of the formula
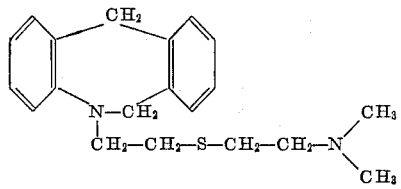
3. The compound of the formula
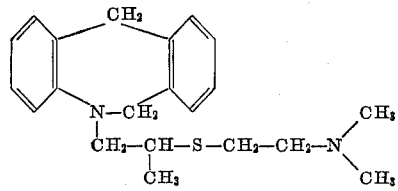
References Cited in the file of this patent
UNITED STATES PATENTS
| | | |
|---|---|---|
| 2,554,736 | Haefliger et al. | May 29, 1951 |
| 2,746,969 | Villani et al. | May 22, 1956 |
| 2,852,510 | Koffmann et al. | Sept. 16, 1958 |
| 2,861,987 | Martin et al. | Nov. 25, 1958 |
| 2,914,527 | Winthrop et al. | Nov. 24, 1959 |
| 2,921,069 | Ullyot | Jan. 12, 1960 |